Feb. 6, 1934.  M. H. GREENEWALT  1,945,635
LIGHT COLOR INSTRUMENT
Filed Jan. 29, 1927  6 Sheets-Sheet 1
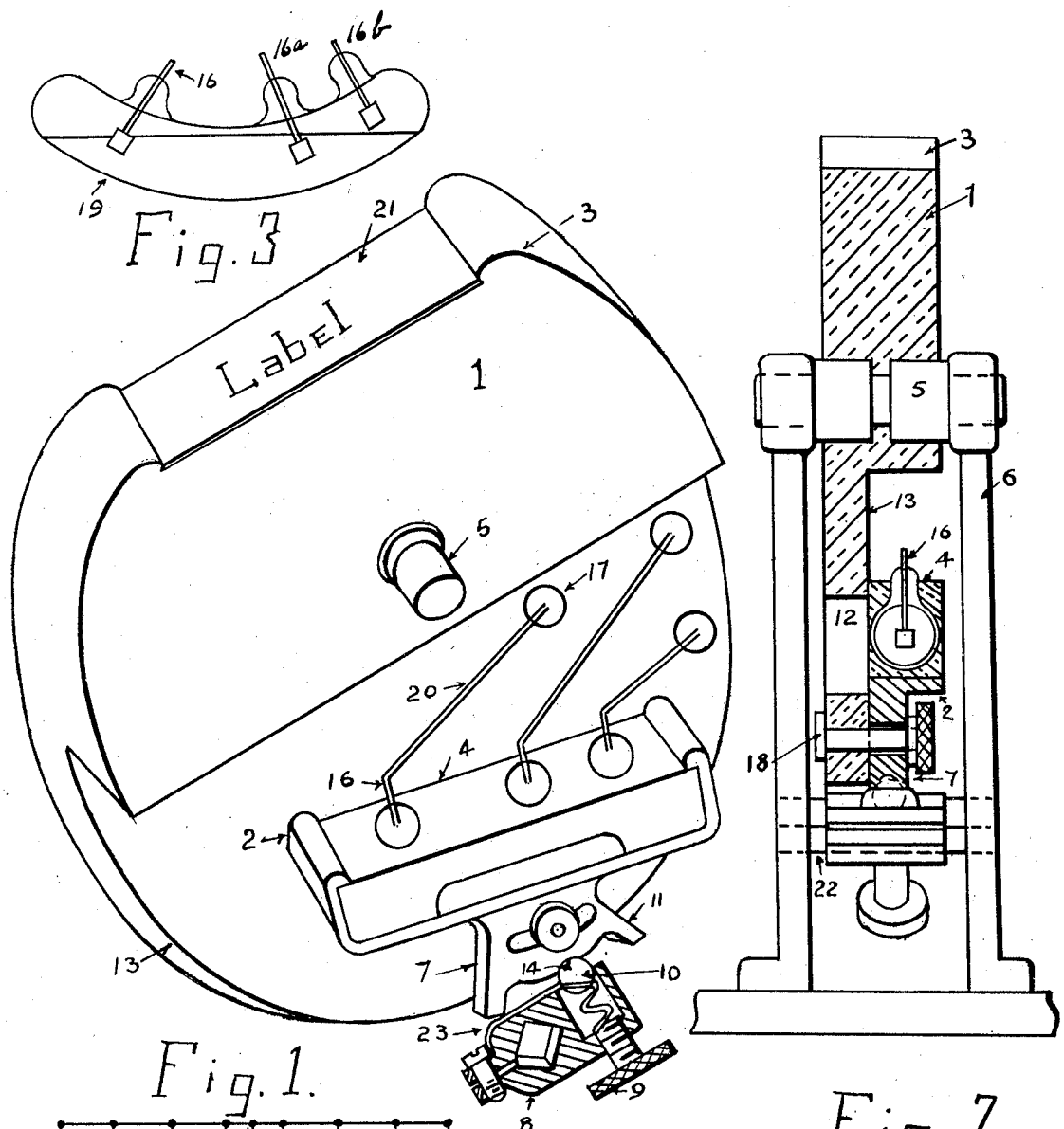
By Mary Hallock Greenewalt
Inventor.

Feb. 6, 1934.     M. H. GREENEWALT     1,945,635
LIGHT COLOR INSTRUMENT
Filed Jan. 29, 1927     6 Sheets-Sheet 2

By Mary Hallock Greenewalt.
Inventor.

Feb. 6, 1934.   M. H. GREENEWALT   1,945,635
LIGHT COLOR INSTRUMENT
Filed Jan. 29, 1927   6 Sheets-Sheet 3
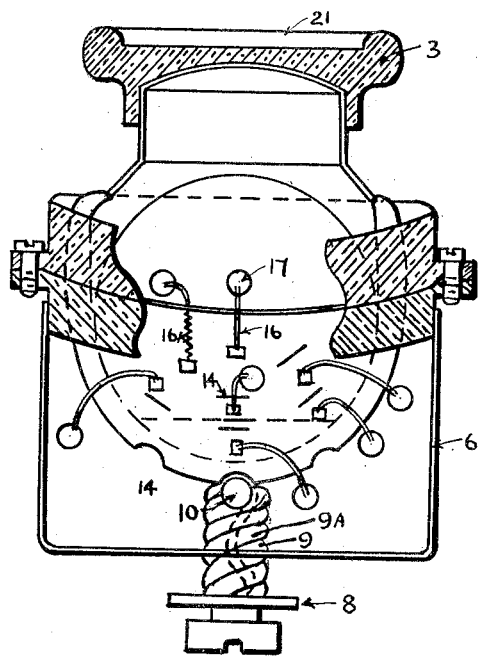
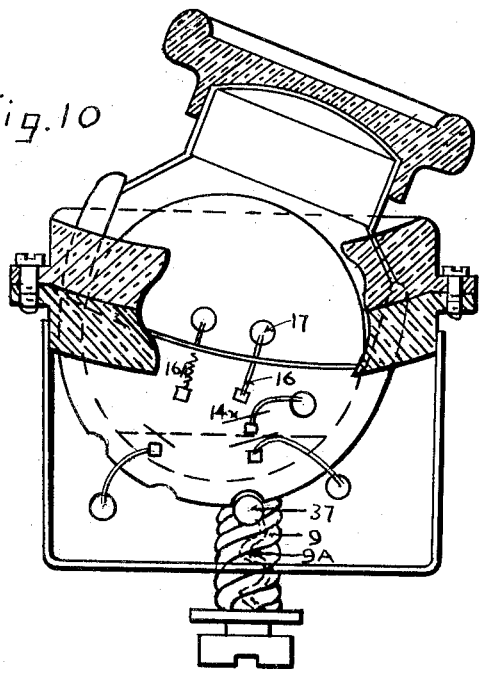
Fig.10
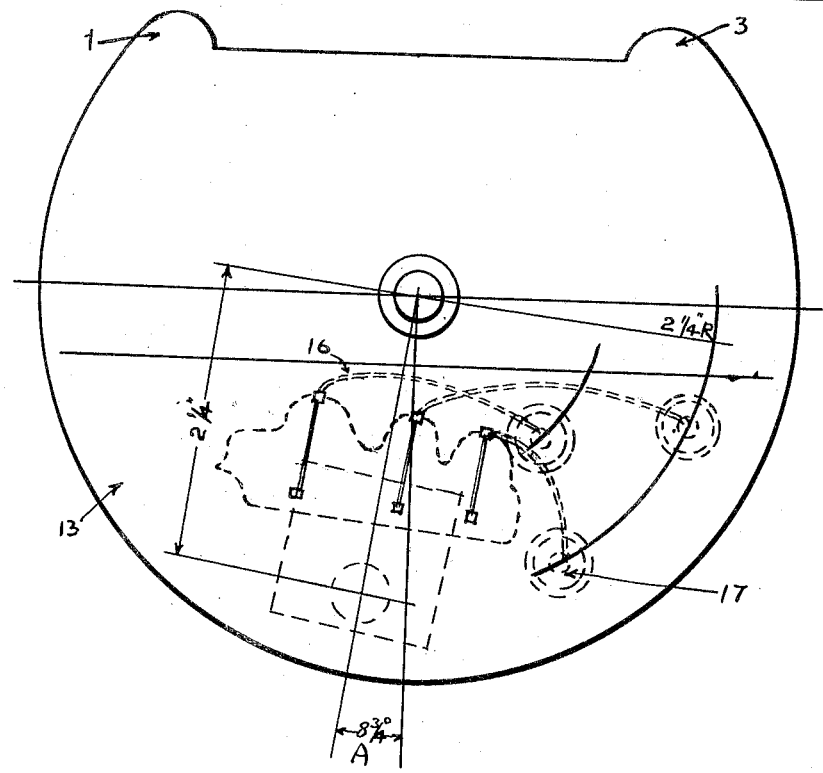
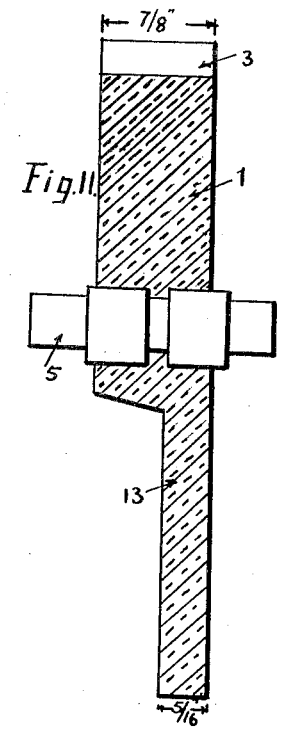
Fig.11
By Mary Hallock Greenewalt.
Inventor.

Feb. 6, 1934. M. H. GREENEWALT 1,945,635
LIGHT COLOR INSTRUMENT
Filed Jan. 29, 1927  6 Sheets-Sheet 4
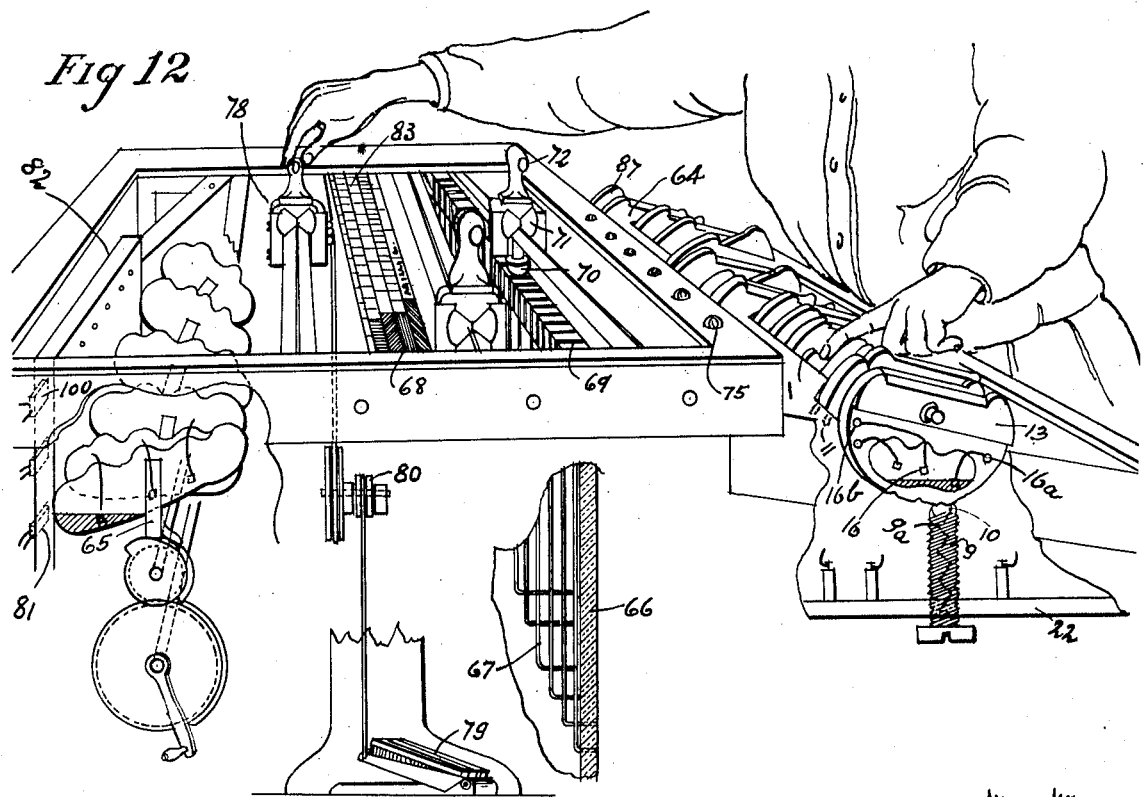
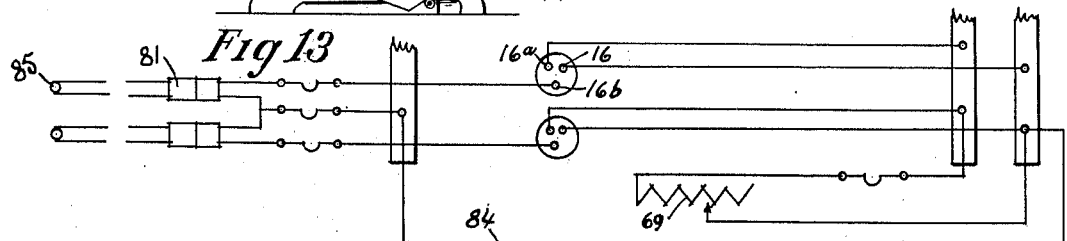
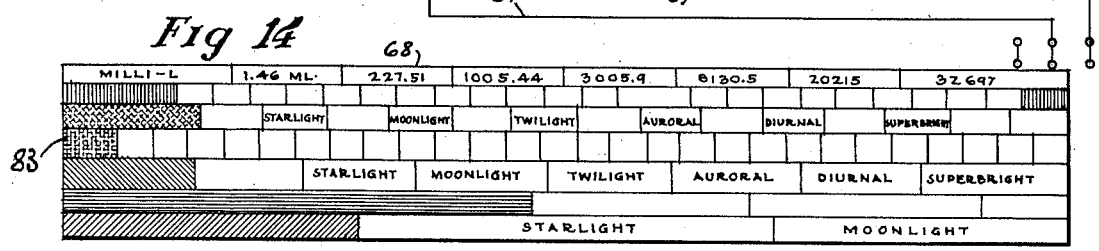
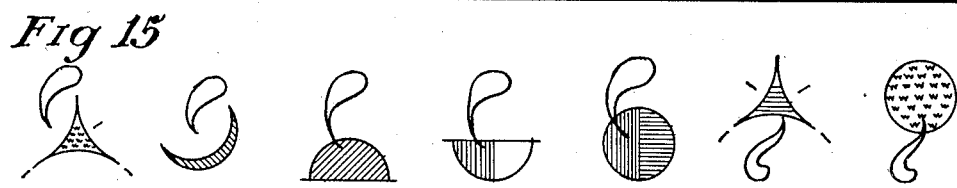
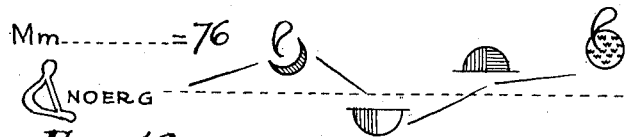
Mary Hallock Greenewalt.
Inventor.

Feb. 6, 1934.    M. H. GREENEWALT    1,945,635
LIGHT COLOR INSTRUMENT
Filed Jan. 29, 1927    6 Sheets-Sheet 5
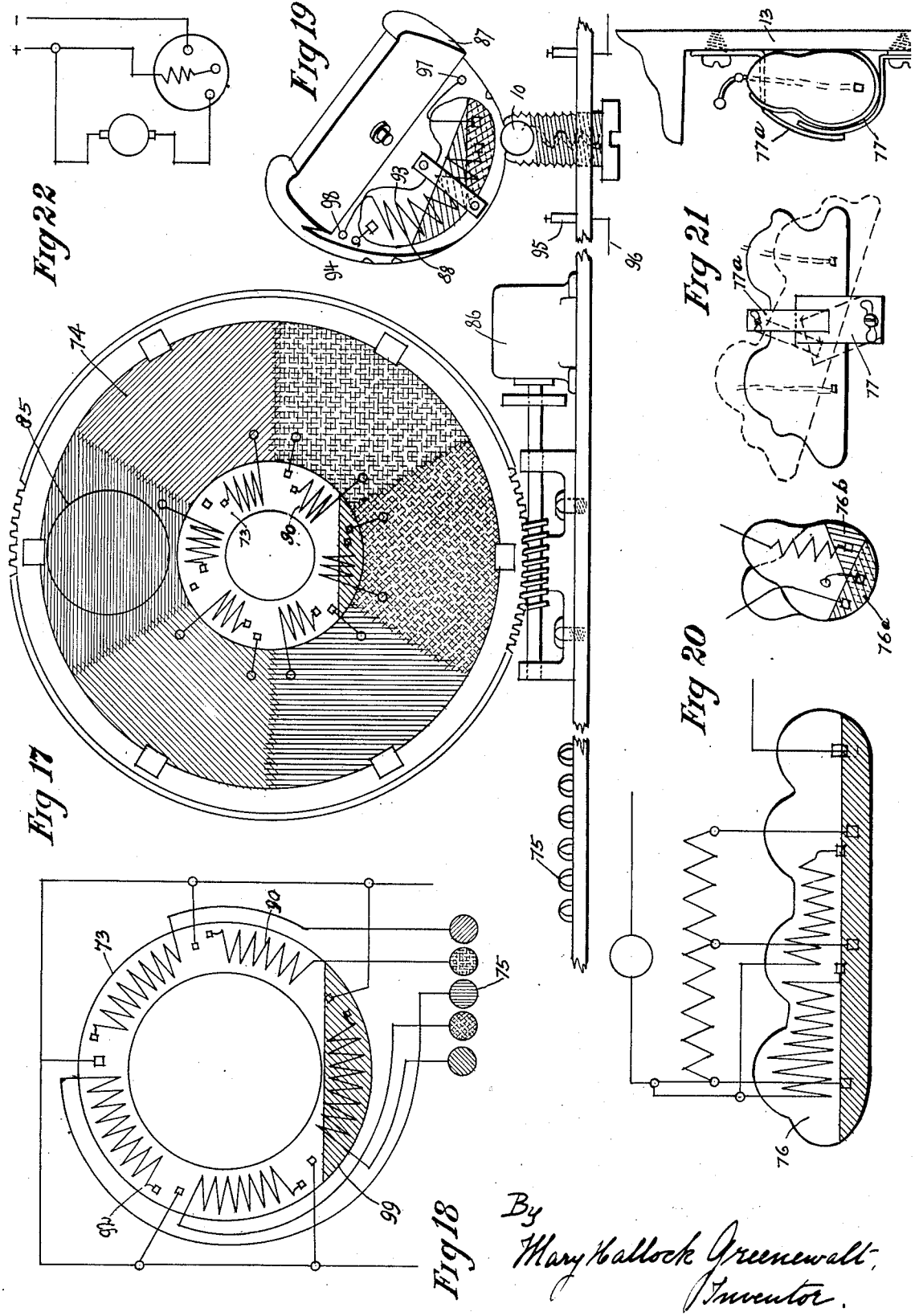

Feb. 6, 1934.  M. H. GREENEWALT  1,945,635
LIGHT COLOR INSTRUMENT
Filed Jan. 29, 1927  6 Sheets-Sheet 6
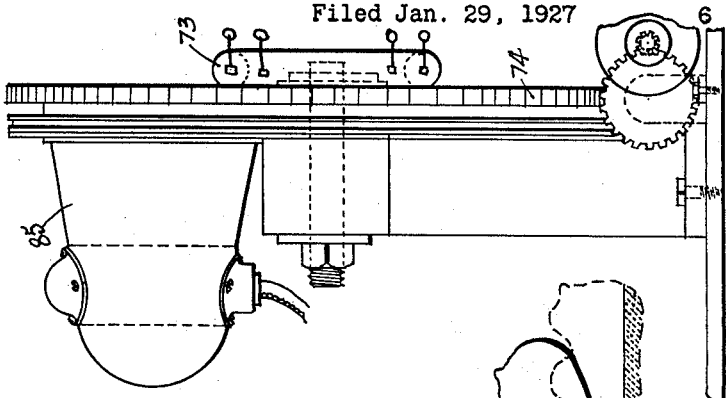
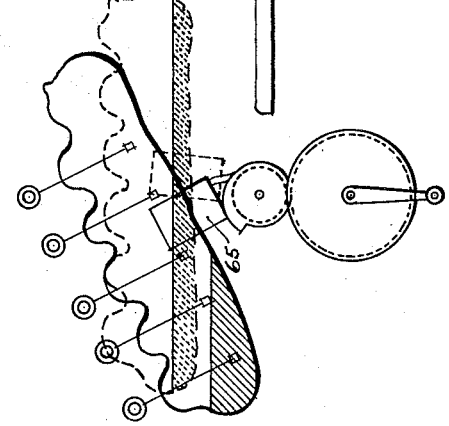
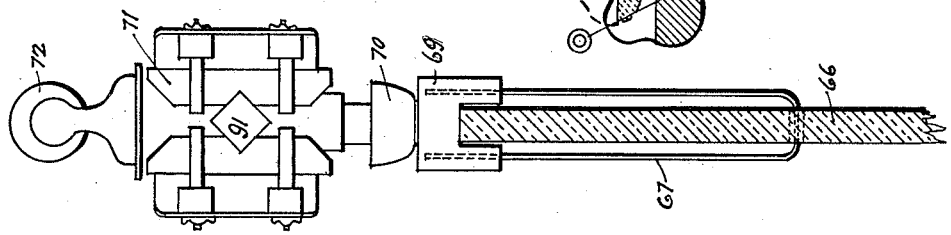
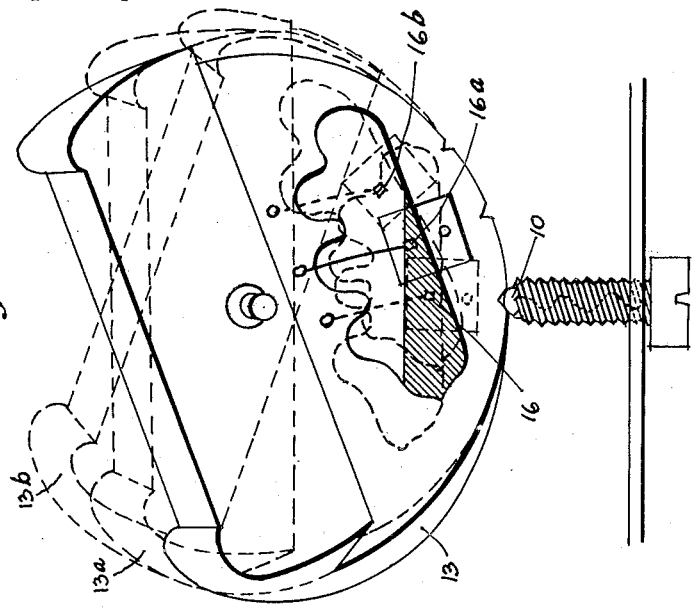
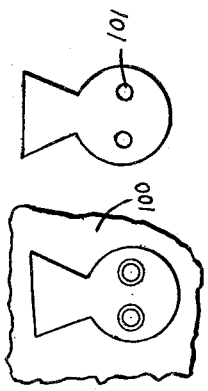
By Mary Hallock Greenewalt
Inventor Patented Feb. 6, 1934

1,945,635

UNITED STATES PATENT OFFICE 1,945,635

LIGHT COLOR INSTRUMENT

Mary Hallock Greenewalt, Philadelphia, Pa.

Application January 29, 1927. Serial No. 164,597

3 Claims. (Cl. 177—346)

My invention relates to a light-color instrument and particularly to the combination of current traversing fluids therewith.

This is a continuation of my application Serial No. 753,911 filed December 4, 1924.

The mixing of actual color, color-shade, color-tint in the form of light rays and the spreading of these over greater or less space, exceeds in variousness that made through dyes or pigments.

To use these rays as a timed means of emotional expression, volitionally, within the moment's intention, requires controls, not only of immense number, housed in a space operable by the reach of the hands and feet, but these must be of the best possible flexibility for response to the co-ordinations of the human body, They must be pliant to muscular "touch"—that nerve motion which may be felt yet scarcely measured. They must follow timing "feel"—that aspect of duration which, though planned on a clock time measure known as rhythm, goes subtly beyond it in its capacity for suggesting shades of mood.

I have discovered that to connect at will any of the great number of circuit terminals which the console of such an instrument must house, contacts which moreover must conduct currents for high wattages, is best accomplished by fluid connectors.

To traverse an electric current by flowing it across from terminal to terminal, or across a terminal to one beyond it, in itself suggests the obedience to feeling which this means accomplishes. It carries no break between the time of bridging one terminal to another; it offers a flexibility and variety in the moment's circuit choice, and that controlled by the slightest of hand motions, of limitless result.

One object of my invention is to provide a console for a light-color instrument.

Another object of my invention is to provide fluid connectors for such an instrument.

Another object of my invention is to raise or lower a current transmitting fluid about a resistor element for the purpose of increasing or decreasing its resistive action.

Other objects and advantages of my invention will appear as the description proceeds, and while my improved forms of fluid connectors have special relation to the controls of a light-color instrument, their features will be found applicable to other mechanisms which need not be enumerated.

My invention will be particularly described in connection with the accompanying drawings, which form a part of this specification and in which:—

Fig. 1 is a perspective elevation of a part of my invention.

Fig. 2 is a cross-sectional elevation of Fig. 1.

Fig. 3 is a side elevation showing one form of glass container switch without its supporting and actuating parts.

Fig. 4 shows diagrammatically, a group arrangement of fluid connectors as used in my invention.

Fig. 9 is a bottom plan view of Figs. 5 and 10.

Fig. 10 is a spherical form of fluid connector switch.

Fig. 11 shows detail parts of Fig. 1.

Fig. 12 is a perspective view of the console of my invention.

Fig. 13 is one of the wiring diagrams used in Fig. 12.

Fig. 14 is a light-color scale which is a part of my invention.

Fig. 15 represents codification symbols for the light scale.

Fig. 16 shows symbols represented in Fig. 15, recording a light sequence conception.

Fig. 17 shows fluid connectors between the lamp unit parts of my invention.

Fig. 18 is a diagrammatic plan of the wiring for Fig. 17.

Fig. 19 represents a control means for Fig. 17.

Fig. 20 represents a resistance switch of my invention.

Fig. 21 represents adjustable mounting clips for the switching parts of an actuator.

Fig. 22 is a wiring diagram for Fig. 19.

Fig. 23 is a view of Fig. 1 in different positions.

Fig. 24 is a side view of the lamp unit part of my invention.

Fig. 25 is a plug with distinguishing conformation.

Fig. 26 is an enlarged section of rheostat of my invention and

Fig. 27 shows a section of switching sequence which is a part of my invention.

In the drawings like parts are similarly numbered.

Figures 5, 6:
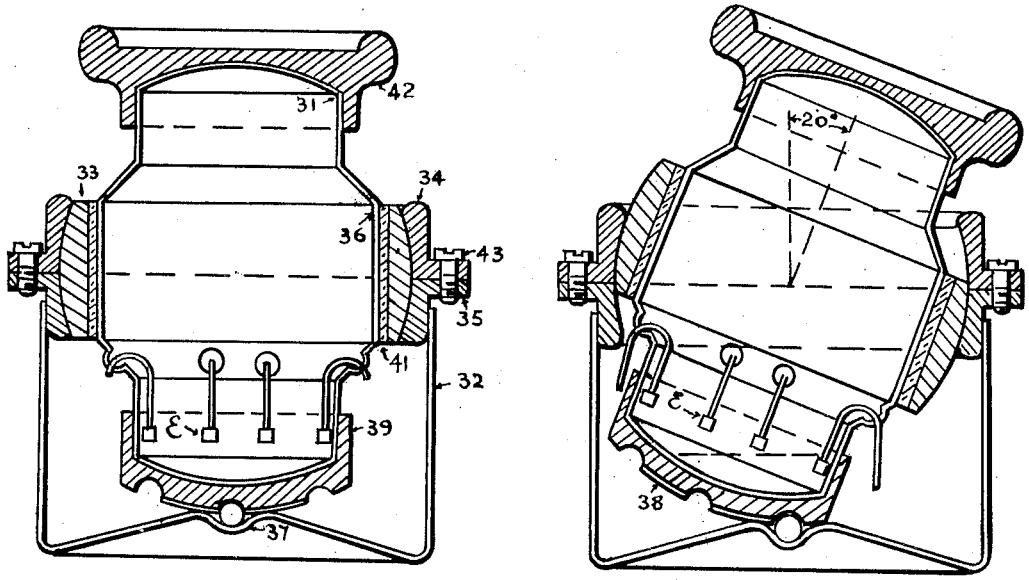
Figs. 5 and 6 show cross-sectional elevations of another form of fluid connectors in different respective positions.

In Fig. 12 I have shown the general position of an operator seated at the console of my light-color instrument. One hand will be seen grasping the handle of a light intensity key energizer 78, while the other hand is moving a fluid actuator.

The light intensity key controller 78 is shown also operable by pedal means 79 through pulleys working over a drum 80.

Three light intensity scaling elements are shown in Fig. 12, the resistance sections of which are computed to deal out from darkness up the least visible increments of a light source according to the seeing curve of the eye. These resistance sections are subject of my Patent No. 1,357,773.

Further details of these scale elements as shown in the unit closest to the operator in Fig. 12, may be seen in enlarged section in Fig. 26.

It is to be remembered that there are but six colors, though an infinite variation in the shades and tints and intermixture of these shades and tints of the six spectral colors. By laboratory measurement there are 267 least visible increments in one 1500 watt lamp. The playing of a light-color scale is therefore a matter of playing on light gradation keys by a sliding or similar motion and has no useable or operable relation with the hitting action or the separate notes these represent of instruments of percussion or the separate notes of any instrument.

In Fig. 26 a light gradation key is shown as 69 actuated by the shoe 70 rolled on to the key by eccentric wheels 71 moved by means of the handle 72 over a square contact making rod 91. The ohmic capacity of the wire 67 is such that used in a lamp of given wattage will yield a definite amount of light to the eye, as shown at 68, Fig. 14.

The successive commutator keys when played on by the slider, create a light gradation scale of imperceptible increase, no matter how long each key is dwelt on, and in Fig. 14 I have shown this scale with its color ratios proportioned as these are found in their differing quantities in artificial light.

The scale 93 is shown on the console top marked in proper position to the commutator keys, which, when actuated, create the light gradations marked opposite to them.

In Fig. 15 I have shown codified symbols which in themselves denote the number of the gradation, the scale division and the color proportioning of the shade desired all in the one figure or figures combined.

In Fig. 16 is shown the way these symbols make a universal record for light play compositions useable by anyone, anywhere for a like result with the metronome marking as guide for the manner of their progress in rhythmic time.

At the back of the console, Fig. 12 is shown a panel board 82, and plugs 81, which will be referred to again later.

The lamp units, one form of which is shown in Fig. 24, are for reasons brought about by the nature of the physics of light, as well as by the large quantity of illumination which the instrument is called upon to handle, placeable at any distance away from the console, and are therefore plugged in to the console, the wiring being of any desired length no matter how large or how small the auditorium, or the space the illumination is to cover. It is because the rays of light begin to diverge from the point of their source that for coloring space the unit must be placed in the best possible position regarding the area to be illuminated, and may therefore be at any respective position to its control centre, far or near.

Directly in front of the operator Fig. 12 is seen a bank of fluid switch actuators staggered in the manner schematically shown in Fig. 4. In each of these actuators are found centralized groups of circuit terminals, whose connections may be made in volitional succession and according to volitional choice by means further on described.

A portion of the console top is shown cut away to disclose a disc form of this centralized circuit grouping detailed in Figs. 1 and 11. In these figures, 1 is a member of the general shape of a disc, and is made of insulation material, preferably moulded.

This disc-shaped member 1 is provided with a central gudgeon, or journal bearing stud 5, which may be moulded into the disc composition as part of the process of giving the disc its shape. Obviously, instead of a journal, a bushing might be moulded in the disc. The disc 1 is cut away, throughout nearly half its diameter in order to give a recessed flat face 13 against which a clip or switch supporting bracket 2 is mounted, through the agency of a trunnion 12, which is inserted in a hole in the side wall of the recessed portion of the disc. The angular position of the trunnion 12 can be adjusted within a few degrees by means of a clamp screw 18, working in a slot, which may be cut in a fin 7 on the bracket 2, or other supporting clip 77. The purpose of this adjustment, here referred to, will be explained later.

The mercury switch carried by the bracket 2 is in the shape of a bottle which may be straight, or curved, as shown in Fig. 3. This bottle is secured in place on the bracket in any suitable way for making the necessary angular adjustments between the angle of electrical action and its manual actuation. The bottle is provided with a number of projections of glass through which electrodes 16, 16a and 16b are introduced to its interior.

The parts, explained above, constitute the essential elements of my disc switch. In order that the particular circuits, under the control of any given switch element may be quickly ascertained, I have provided each disc switch with a thin label plate 21, which may serve to label any use the switch element is put to. The plate 21 is preferably made of a resilient, fireproof material, such as sheet steel, and in a light color instrument it might be of various colors, and the labels used as well to designate the locations of the several lamps. Each label is sprung under the inner edges of a pair of projections 3, which are integral with the disc 1. These projections have as their principal function the provision of finger grips to enable an operator to move the switch from one operative position to another. Each switch may have several operative positions, only three being indicated in Fig. 1.

It will be understood that the switch parts described above are mounted oscillatorily in uprights, or standards 6, which receive the journals of the gudgeon shaft 5. These uprights also support a square shaft 22 upon which a clamp block 8 is slidably mounted. This clamp block is provided with a ball shaped hold 10 which is positioned to bear against the fin 7 of the disc member 1. It is resiliently and slidably mounted in the block 8 so as to be capable of bearing against the disc element with different degrees of tension, simply by adjusting screw 9, which causes a spring 9a in the block to thrust the ball outwardly with more or less pressure. The fin 7 has a number of indentations and it will be seen that the function of ball 10 is to arrest the disc 1, every time the ball registers with one of these indentations. The approach to these indentations is of a gradual cam shape, so that the ball 10 engages them without shock and rides easily out of them. The particular curve of cam is an important feature, because it contributes in no small measure to a proper sense of "feel" in changing the switch position from one point to another. The arrest or check in the movements of disc 1 will thus be seen to be capable of a nice adjustment to the strength of a man's or a woman's hand, and to the individual taste of either in changing from one circuit position to another. To prevent overriding the series of indentations, I have provided the outer ones with lugs 11 which serve as positive stops when the disc member has reached either extreme position. Obviously this system of stops might be disposed on any part of the circumference of disc 1.

In Fig. 13 I have shown the wiring diagram between actuator shown in Fig. 12 as 13, the light scaling unit 69, the lamp 75, and the line 84. The manner of putting these portions of the device into practice would be as follows: with the switch actuator in the first position shown in Fig. 23 and also shown tilted towards the operator in Fig. 12 the contact terminal 16a which is the rheostat leg only would be immersed in the contact making fluid and therefore no circuit made. On tilting the actuator to position 13a the contact making fluid can with a nicety be made to flow towards contact 16 or the live line leg. On bridging to this contact both contacts 16 and 16a would be immersed in the contact making fluid and circuit including the lamp and the rheostat established. Any playing on the lamp would proceed till tilting of the actuator to position 13b or the extreme position away from the operator shown at Fig. 12, 1. At this point the contact fluid would have left contact 16a and established the lamp "on the line" the rheostat being left free for handling the intensity of other lamps when the operation can be repeated for all the lamps in the grouping.

It will be seen from Fig. 3 that a momentary contact may be made across three legs of this lighting circuit as the switch element passes from one detent hold, or position, and the next, before the mercury drops the third contact to establish the circuit permanently across two legs only. This interplay of circuits in contact transition is an important factor in light color play. As one example of its importance, through this agency, one may place a lamp "on the line", before breaking complete contact with a resistance, in order that no flicker or moment of darkness may intervene between the two operations, whereas, without such a provision the effect would be akin to a blot on a picture, or an inharmonious dissonance in music.

It will be seen how technique in the playing will enrich the possibilities as in any veritable instrument. Since by laboratory measurement the eye can distinguish as many as 267 least visible increments in a 1500 watt lamp and since gradation counts potently in light-color mixing it will be seen that one will wish to hold a lamp not only at full brightness "on the line" but at a portion of its brightness while still freeing the scale for playing use. For doing this I have devised switch unit shown in Fig. 20 where a switch tilted over on its side 76b will include a resistance element to hold a lamp at some fraction of its brightness.

Figures 7, 8:
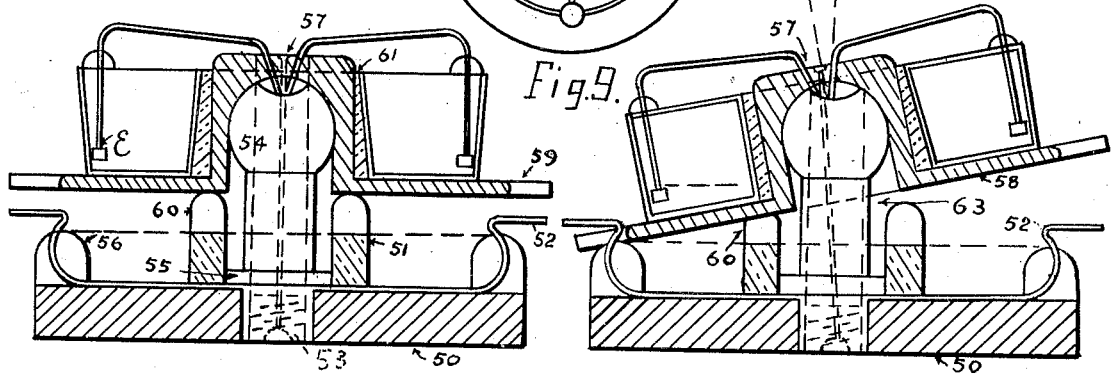
Figs. 7 and 8 show cross-sectional elevations of another form of fluid connector switch in different respective positions.

In Figs. 5 to 10 I show increased numbers of circuit terminals centralized within the same actuator at the same time as allowing volitional choice as to the succession their use shall make.

It is plain that differing light ray colors cannot be projected from the very same position unless the color filtering medium is changed before the same reflector and it is for that reason that I consider the so-called color wheel driven by a motive force Fig. 17, an integral part of my light-color instrument.

In Fig. 17 I show a color wheel 74 moved in front of a reflector opening 85 by a motor 86. This motor is energized by the fluid switch actuator 87 which is also shown placed on the console, Fig. 12, at the extreme right of the staggered banks of actuators in front of the operator.

The fluid contact making element 93 mounted on the actuator 87 has a resistor 88 included within its confines and as the actuator 87 is rolled over or across the resilient hold 10 the electricity conducting fluid body is gradually raised about the resistor portions while at the same time the resistor is also gradually dipped into the conducting fluid.

This action forward or back by gradual cutting into or out of the resistance quantities increases or decreases the amount of energy translated into the motor 86 by means of leads 94 binding posts 95 and conductor wires 96 and causes the color wheel 74 to be moved faster or slower about the lamp reflector 85. By reversing the live line contact 97 to the live line contact 98 on the opposing side of actuator 87 the action of the motor can be reversed and the wheel moved forward or back similarly. The diagram for the above connections is shown in Fig. 22.

In this way the operator at the console can make the one lamp source yield any one of the six colors of the spectrum from exactly the same point of the light ray departure, and can so light precisely the same space but by different colors from the one unit.

Since, however, in a series art of light color play it is essential to know which of the colors is going to result on energizing the lamp back of the several color filtering mediums of the color wheel. I have provided a fluid signalling means for the various color sectors to act on the signal reporting factors 75, which are also shown mounted on the console.

This signalling means described in my co-pending application entitled "Improvement in signalling means" Serial No. 179,697 filed March 30, 1927, consists of a ring form of container of fluid connector means 73 placed at the center of the color wheel directly beneath the reflector 85, with contact leads 92 making a separate circuit for every color and going to its respective signalling factor 75. These may be signalling lamps, when the resistors 90 between the contacts will as these are dipped more or less into the contact making fluid cause the signal lamps to glow increasingly brighter or increasingly darker, thus telling the operator the moment when he may expect another color to become available to the field of action. The diagram of the signalling factors is shown in Fig. 18.

It will be seen that there is therefore a direct "touch" connection between the sensitiveness with which the fluid actuator 87 is moved over the ball hold 10, and the arrival of the desired color into the field of action; the exact time of the arrival of the desired color being under the control of the operator since the increase or decrease in the brightness of the signal lamps points to the color wheel's progress. The action of the fluid in actuator 87 defines the action of the fluid in ring 73, through the motor 86.

At the rear of the light instrument console I have shown a series of fluid connector switches 65 mounted on a common shaft for the serial actuation of those larger quantities of illumination which, striking the eye when its sensitiveness to light has been more or less saturated, will nevertheless come to it as least visible gradations. This serial actuation of switches may, in part or in whole be placed at a spot remote from the light-color instrument when the actuation of this part of the lighting mechanism will be operated by a console controlled motive force or motor.

It will therefore be seen that the energy translating devices which may be connected up to my light instrument console are of various and differing kinds.

It may also be necessary to unplug certain lamps or devices and plug in others during the time of performing on the instrument. Since the darknesses of light, from the zero point up, are a potent factor in expressing by means of light, this plugging and unplugging may well need to be done largely by identification of touch rather than sight.

I have therefore illustrated in Fig. 25 a socket member 100 that has a predetermined configuration that may be located at the console as shown. In 101 is illustrated a plug member of substantially the same configuration as the co-operating plug member and provided with a pair of contact pins to which the ends of a supply circuit conductor may be connected in the usual way. The socket member is provided with co-operating terminal sockets that are engaged by the pins of the co-operating plug member when the contact plug is pushed home into the contact socket. By the special and distinguishing conformations the operator will be able to make sure in the dark the proper plug to insert in the proper socket. 102 illustrates a contact plug of different configuration similarly usable which conformations may be obviously varied in their sorts. A plug of one conformation cannot be pushed into a socket of a different conformation, thereby preventing wrong or unwanted connections.

Variety in light-color mixture, light-color shade light-color tint cannot be met in point of number or in manner of use by the joining of any of these to the notes of musical instruments. Light is a sense phenomena all its own. An aesthetic expression is a result of group factors. The physical points of light cannot be disintegrated and joined to the disintegrated elements of any other form of sense perception and still exist as a means of expression to the field of vision.

My discovery of flowing contact making fluids in a manner subject to choice across a vast number of terminals with safety and in high power energies, unhampered by wrong premise, came at its logical moment in my creating of the art of light-color expression as a means of emotional speech.

I desire that no limitations be placed on the results of my labors except those that can be imposed by the prior art.

I claim as my invention:

1. In a console for controlling lighting means to produce various color effects, a substantially rectangular frame, a plurality of light intensity varying rheostats each including an elongated resistant member, a contact, means for supporting the contact for sliding movement along the rheostat and a handle for the contact, means for supporting the rheostats in parallel relation crosswise of said frame with the handles extending above the frame, an extension on one of the sides of the frame, a plurality of current controlling members consisting of a disk-like operating portion having a substantially flat peripheral portion for finger engagement and a fluid conducting element means mounting said controlling members in groups of rows substantially extending parallel to said rheostats, certain of said elements including contacts and at least one other including a current modifying element and connecting means including the contacts of certain of said members in circuit with a rheostat.

2. In a console for controlling lighting means to produce defined color effects, a substantially rectangular frame, a plurality of light intensity varying units, means for supporting said units in parallel relation cross-wise of said frame, a plurality of current controlling members consisting of a disk-like operating portion having a substantially flat peripheral portion for finger engagement and a fluid current conducting element, means mounting said controlling members in groups of rows substantially parallel to said units the operating position of said console, certain of said members including contacts and at least one other including a current modifying element, connecting means including the contacts of certain of said members in circuit with said light intensity varying units and a light intensity indicating scale adjacent said units.

3. In a console for controlling lighting means to produce defined color effects, a substantially rectangular frame, a plurality of light intensity varying units, means for supporting said units in substantially parallel relation cross-wise of said frame, a plurality of current controlling members consisting of a disk-like operating portion having a substantially flat peripheral portion for finger engagement and a flexible current conducting element, means mounting said controlling members in groups of rows substantially parallel to said units, certain of said members including contacts and at least one other including a current modifying element, connecting means including contacts of certain of said members in circuit with said light intensity varying units and a light color intensity indicating scale adjacent said units.

MARY HALLOCK GREENEWALT.